(12) United States Patent
Lin et al.

(10) Patent No.: US 6,562,175 B1
(45) Date of Patent: May 13, 2003

(54) METHOD OF CONTROLLING ULTRAVIOLET GLUE SIZE FOR LIQUID CRYSTAL DISPLAY DEVICES

(75) Inventors: Chih-Chan Lin, Tainan Hsien (TW); Ting-Chiang Hsieh, Hsinchu Hsien (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 145 days.

(21) Appl. No.: 09/675,446

(22) Filed: Sep. 28, 2000

(30) Foreign Application Priority Data

Nov. 29, 1999 (TW) ........................................ 88120772 A

(51) Int. Cl.⁷ ............................................. G02F 1/1333
(52) U.S. Cl. ........................ 156/272.2; 156/290; 349/92; 349/93
(58) Field of Search ..................... 156/107, 109, 156/272.2, 275.5, 275.7, 290, 291; 349/92, 93, 94, 153, 160; 428/1.5

(56) References Cited

U.S. PATENT DOCUMENTS 5,831,710 A * 11/1998 Colgan et al. ............... 349/155
6,219,126 B1 * 4/2001 Von Gutfeld ............... 349/153

* cited by examiner

*Primary Examiner*—Michael W. Ball
*Assistant Examiner*—John T. Haran
(74) *Attorney, Agent, or Firm*—J. C. Patents

(57) ABSTRACT

A method of controlling an ultraviolet (UV) glue size for liquid crystal display (LCD) devices includes using a frame seal or a patterned device layer as a size-controlling material. At first, a pixel electrode matrix structure is formed on a substrate. A frame seal material is then provided along the periphery of the pixel electrode matrix structure and a size-controlling material is provided. The size-controlling material is harder than the UV glue. The size-controlling material is formed with a predetermined shape around a predetermined place in which a UV glue is formed using the predetermined place as the center of the size-controlling material. The predetermined shape of the size-controlling material includes a U-shape, an arch-shape, a line-shape or a L-shape. Next, the UV glue is formed in the predetermined place, which is preferably the corners of the pixel electrode matrix structure.

28 Claims, 3 Drawing Sheets

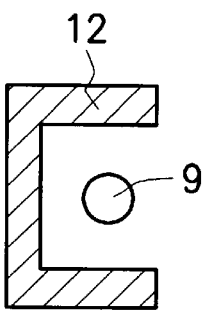 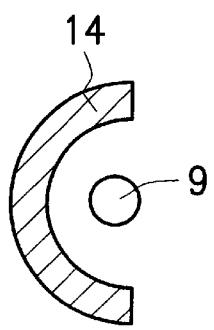 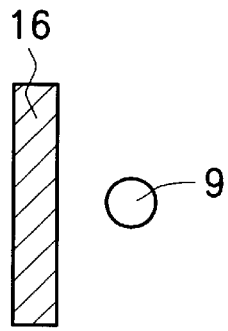 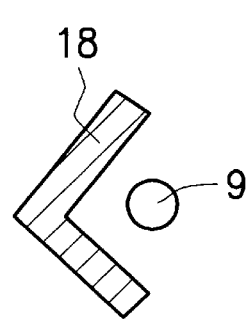
FIG. 3A    FIG. 3B    FIG. 3C    FIG. 3D
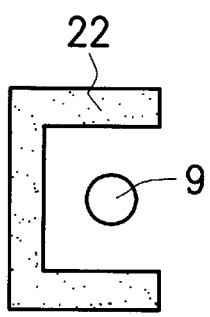 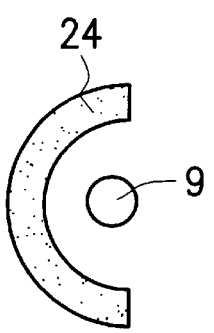 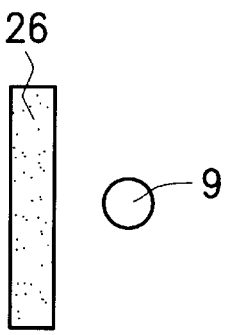 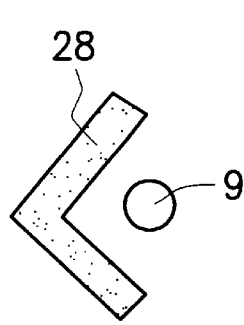
FIG. 4A    FIG. 4B    FIG. 4C    FIG. 4D
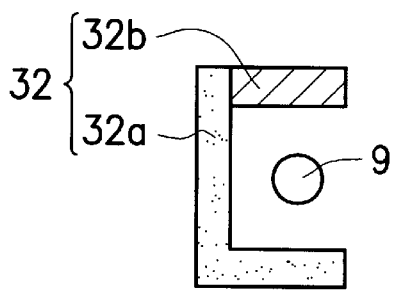 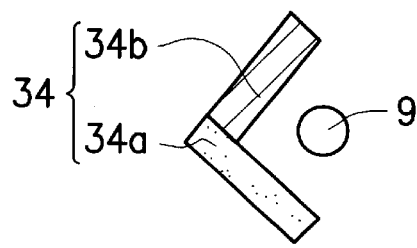
FIG. 5A      FIG. 5B

METHOD OF CONTROLLING ULTRAVIOLET GLUE SIZE FOR LIQUID CRYSTAL DISPLAY DEVICES

CROSS-REFERENCE TO RELATED APPLICATION

This application claims the priority benefit of Taiwan application serial no. 88120772, filed Nov. 29, 1999.

BACKGROUND OF THE INVENTION

1. Field of Invention

The present invention generally relates to a method of controlling an ultraviolet (UV) glue size for liquid crystal display (LCD) devices, and more particularly to a method of controlling a UV glue size for an alignment table which is used in fabricating LCD devices.

2. Description of Related Art

In accordance with advances in electronic device techniques, the application of LCD devices is currently becoming wider. It is usually necessary to use glue materials for packaging LCD devices. This is usually done with a UV glue. As the LCD devices are scaled down, LCD device size is increasingly shrinking and the LCD circuit array is located closer to a substrate edge. Thus, the LCD panel design becomes even more critical. If the size of the UV glue is too large, the LCD packaging will be degraded and the LCD panel sawing will be more difficult. This leads to degradation of the LCD device performance and reduction of the yield of the LCD devices.

FIG. 1 is a schematic, cross-sectional diagram showing a conventional LCD device. As shown in FIG. 1, two glass substrates 2 and 3 are provided, wherein the substrate 2 can be a drive substrate and the substrate 3 can be an opposing substrate. Next, referring to FIG. 2A, a pixel matrix structure 4, a frame seal 5 and an externally connected pad 6 are provided on the substrate 2. An injecting hole 30 of the frame seal 5 is formed on one side of the pixel matrix structure 4. The pixel matrix structure 4 is composed of a pixel electrode, a storage capacitor, a switching element, etc. While packaging a LCD device, the frame seal 5 is sealed along the periphery of the pixel matrix structure 4 on the drive substrate 2. The drive substrate 2 can be sealed (overlapped) with the opposing substrate 3, wherein the drive substrate 2 must be precisely aligned with the opposing substrate 3, using alignment marks 7 and 8. The alignment mark 7 is formed on the drive substrate 2. The alignment mark 8 is formed on the opposing substrate 3 (shown in FIG. 2B).

FIG. 2B (corresponding to FIG. 2A) is a schematic, cross-sectional diagram showing an alignment step for conventional LCD devices. As shown in FIG. 2B, a glass substrate 2 is located on an alignment table 10, for example an X-Y-θ alignment table. An alignment mark 7 is formed on the glass substrate 2. Another glass substrate 3 is located above the glass substrate 2 and an alignment mark 8 is formed thereon. A microscope 11 is provided, which is located above the glass substrate 3. The microscope 11 can move freely over the glass substrate 3 for determining whether the alignment mark 7 is aligned with the alignment mark 8. The glass substrate 2 can be aligned with the glass substrate 3 by the alignment of the alignment mark 7 and the alignment mark 8.

When aligning the glass substrate 2 and the glass substrate 3, it is necessary to seal the glass substrate 2 and the glass substrate 3 together. The method of sealing the two glass substrates 2 and 3 includes first irradiating the packaging glue 9 (UV glue) with UV light to seal the two glass substrate 2 and 3, slightly. The UV glue 9 is formed in the corners of the two glass substrates 2 and 3, as shown in FIG. 2A. The frame seal 5 formed on the glass substrate 2 is then treated with a pressure process and a baking process. Thus, the glass substrate 2 and the glass substrate 3 can be sealed very tightly. Next, a LCD material is injected between the glass substrate 2 and the glass substrate 3 through the injecting hole 30 (shown in FIG. 2A).

When the LCD circuit array is located closer to the edge of LCD substrates and the LCD panel design is increasingly critical, the demand for the quality of UV glue also becomes more critical. If the UV glue is too large, the quality of the LCD packaging will be degraded and sawing the LCD panel will be more difficult. This will then lead to degradation of LCD device performance and reduction of the yield of the LCD devices.

SUMMARY OF THE INVENTION

Accordingly, the object of the present invention is to provide a method of controlling the size of UV glue used to seal an alignment table of an LCD device.

To achieve these and other advantages and in accordance with the purpose of the invention, as embodied and broadly described herein, the invention provides a method of controlling the size of a UV glue for liquid crystal display (LCD) devices.

The first embodiment of the present invention includes using a frame seal as a size-controlling material to control the size of the UV glue. The frame seal includes a thermally hardened epoxy resin, a thermally hardened epoxy resin/thermal phenoxy resin, an epoxy resin which is inarched with a silicon rubber, or a silicon rubber.

First, a pixel electrode matrix structure is formed on a substrate. A frame seal material is provided along the periphery of the pixel electrode matrix structure. A size-controlling material is then provided. The size-controlling material is harder than the UV glue. The size-controlling material is preferably a frame seal, a thermally hardened epoxy resin, a mixture of a thermally hardened epoxy resin and a thermal phenoxy resin, an epoxy resin which is inarched with a silicon rubber, or a silicon rubber. The size-controlling material is formed with a predetermined shape around a predetermined place in which a UV glue is to be formed, using the predetermined place as the center of the size-controlling material. For example, the predetermined shape of the size-controlling material includes a U-shape, an arch-shape, a line-shape and a L-shape. Generally speaking, the predetermined shape of the size-controlling material is not limited to the foregoing shapes. Any shape of size-controlling material that performs the function of limiting the out-diffusion region of the UV glue can be used.

The UV glue is then formed in the predetermined place, which is, for example, in the corners of the pixel electrode matrix structure. Next, an alignment step is performed on the substrate. A pressuring process and a baking process are performed on the UV glue. Thus, the size-controlling material can be used for controlling the size of the UV glue.

The second embodiment of the present invention includes using a patterned device layer as a size-controlling material to control the size of the UV glue. The patterned device layer includes a liquid crystal display layer, a thin film transistor (TFT), a storage capacitor and a color filter.

At first, a pixel electrode matrix structure is formed on a substrate. A patterned device layer and a size-controlling material are formed on the substrate, simultaneously. The size-controlling material is harder than the UV glue in order to limit the out-diffusion region of the UV glue. Since the patterned device layer and the size-controlling material are formed simultaneously on the substrate, the size-controlling material can be the same as the patterned device layer, such as a liquid crystal display layer, a TFT, a storage capacitor or a color filter.

The size-controlling material is formed with a predetermined shape around a predetermined place where a UV glue is to be formed, using the predetermined place as the center of the size-controlling material. The predetermined shape of the size-controlling material includes a U-shape, an arch-shape, a line-shape and a L-shape. Generally speaking, the predetermined shape of the size-controlling material is not limited to the foregoing shapes. Any shape of size-controlling material that performs the function of limiting the out-diffusion region of the UV glue can be used.

The UV glue is then formed in the predetermined place, which is preferably the corners of the pixel electrode matrix structure. Next, an alignment step is performed on the substrate. A pressuring process and a baking process are performed on the UV glue. Thus, the size-controlling material can be used to control the size of the UV glue.

The third embodiment of the present invention combines composite the features of the first and the second embodiments includes using both a patterned device layer and a frame seal as a size-controlling material to control the size of the UV glue.

First, a first part of the frame seal material is formed along the periphery of the pixel electrode matrix structure and a second part of the frame seal material is formed in the pixel electrode matrix structure. The patterned device layer is provided on a substrate. Thus, the composite size-controlling material includes the second part of the frame seal and the patterned device layer. The material of the frame seal includes a thermally hardened epoxy resin, a thermally hardened epoxy resin/thermal phenoxy resin, an epoxy resin which is inarched with a silicon rubber, and a silicon rubber. The material of the patterned device layer includes a liquid crystal display layer, a TFT, a storage capacitor or a color filter.

The composite size-controlling material is formed with a predetermined shape around a predetermined place in which a UV glue is to be formed, using the predetermined place as the center of the composite size-controlling material. The predetermined shape of the composite size-controlling material is preferably a U-shape around the predetermined place in which the point-shaped UV glue is to be formed, using the UV glue as the center of the size-controlling material. The composite size-controlling material includes a patterned device layer and a frame seal material, wherein the patterned device layer is L-shaped and the frame seal material is line-shaped. Alternatively, the patterned device layer is line-shaped and the frame seal material is L-shaped. The predetermined shape of the composite size-controlling material is preferably an L-shape around the predetermined place in which the point-shaped UV glue is to be formed, using the UV glue as the center of the size-controlling material, with the patterned device layer in a line-shape and the frame seal material also in a line-shape. Generally speaking, the predetermined shape of the size-controlling material is not limited to the foregoing shapes. Any shape of size-controlling material that performs the function of limiting the out-diffusion region of the UV glue material can be used.

The UV glue is then formed in the predetermined place, which is, for example, in the corners of the pixel electrode matrix structure. Next, an alignment step is performed on the substrate. A pressure process and a baking process are performed on the UV glue. Thus, the size-controlling material can be used for controlling the size of the UV glue.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3A through 3D are schematic, cross-sectional diagrams showing a first method of controlling a UV glue size for an LCD devices of the present invention.

FIGS. 4A through 4D are schematic, cross-sectional diagrams showing a second method of method of controlling a UV glue size for LCD devices of the present invention.

FIGS. 5A and 5B are schematic, cross-sectional diagrams showing a third method of controlling a UV glue size for LCD devices of the present invention.

DESCRIPTION OF THE PREFERRED EMBODIMENTS

First Embodiment

Figure 1:
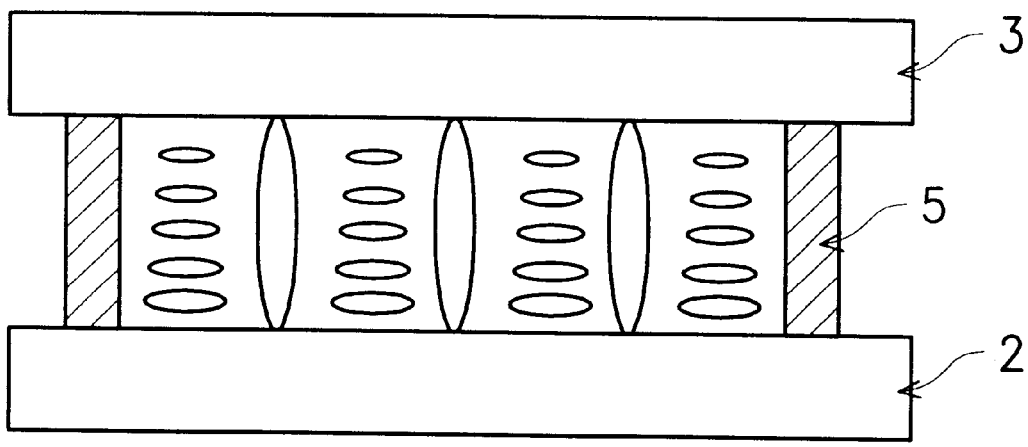
FIG. 1 is a schematic, cross-sectional diagram showing a conventional LCD device.
Figure 2A:
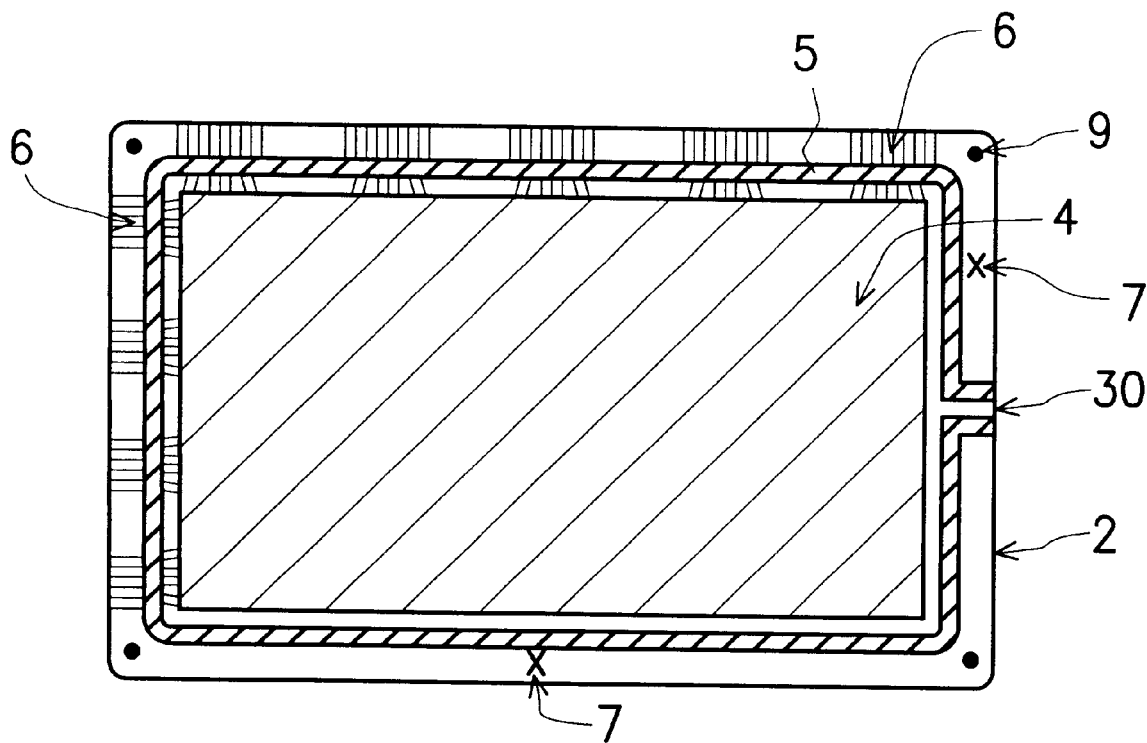
FIG. 2A is a schematic, top-view diagram showing a conventional LCD device with a UV glue and a frame seal formed on a pixel substrate.
Figure 2B:
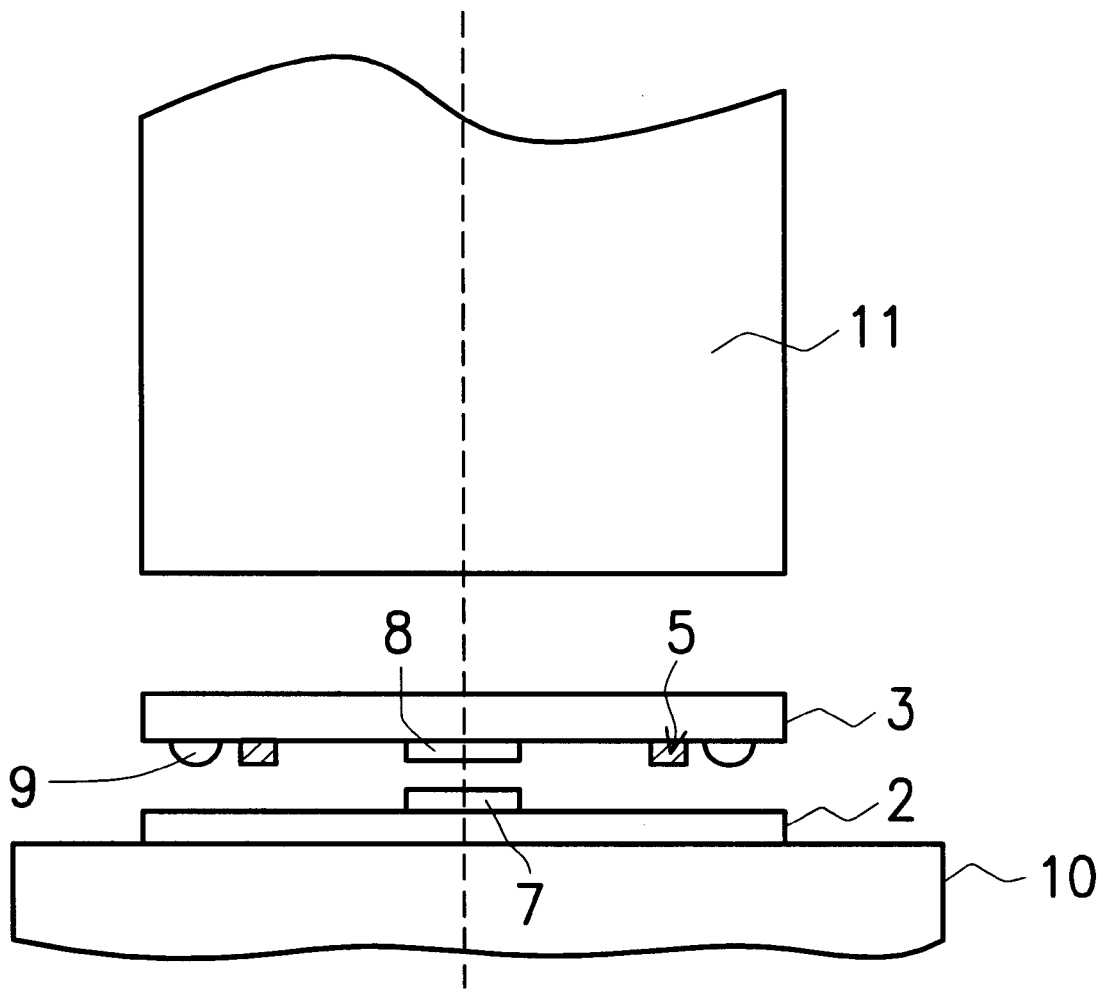
FIG. 2B is a schematic, cross-sectional diagram corresponding to FIG. 2A showing an alignment step for an LCD device.

FIGS. 3A through 3D are schematic, cross-sectional diagrams showing a method of method of controlling UV glue size for LCD devices according to the present invention. The method of the first embodiment includes using a frame seal as a size-controlling material to control the size of the UV glue (packaging material). The frame seal is, for example, a thermally hardened epoxy resin, a thermally hardened epoxy resin/thermal phenoxy resin, an epoxy resin which is inarched with a silicon rubber, or a silicon rubber.

As shown in FIGS. 3A–3D, a pixel electrode matrix structure is formed on a substrate (not shown). The material of the substrate is preferably glass, ceramic, silicon or the like. A frame seal material is provided, which is formed along the periphery of the pixel electrode matrix structure, with an injecting hole formed on one side of the pixel electrode matrix structure (not shown). A size-controlling material (12, 14, 16, or 18) is then provided. The size-controlling material (12, 14, 16, or 18) is harder than the UV glue (packaging material). For example, the size-controlling material (12, 14, 16, or 18) includes a frame seal, a thermally hardened epoxy resin, a thermally hardened epoxy resin/ thermal phenoxy resin, an epoxy resin which is inarched with a silicon rubber, or a silicon rubber.

The size-controlling material (12, 14, 16, or 18) is formed with a predetermined shape around a predetermined place in which a packaging material 9 (UV glue) is to be formed, using the predetermined place as the center of the size-controlling material (12, 14, 16, or 18). For example, as shown in FIG. 3A, the predetermined shape of the size-controlling material 12 includes a U-shape around the predetermined place in which the point-shaped packaging material 9 is to be formed, using the predetermined place as the center of the size-controlling material 12. As shown in FIG. 3B, the predetermined shape of the size-controlling material 14 includes an arch-shape around the predetermined place in which the point-shaped packaging material 9 is formed using the predetermined place as the center of the size-controlling material 14. As shown in FIG. 3C, the predetermined shape of the size-controlling material 16 includes a line-shape around the predetermined place in which the packaging material 9 is to be formed, using the predetermined place as the center of the size-controlling material 16. As shown in FIG. 3D, the predetermined shape of the size-controlling material 18 includes a L-shape around the predetermined place in which the packaging material 9 is formed using the predetermined place as the center of the size-controlling material 18. Generally speaking, the predetermined shape of the size-controlling material is not limited to the foregoing shapes (12, 14, 16, or 18). Any shape of size-controlling material that performs the function of limiting the out-diffusion region of the UV glue can be used.

The packaging material 9 is then provided in the predetermined place, which is, for example, in the corners of the pixel electrode matrix structure. The packaging material 9 is point-shaped. The packaging material includes a UV glue or a UV-hardened epoxy resin. Next, an alignment step is performed on the substrate. A pressuring process and a baking process are performed on the packaging material 9. Thus, the size-controlling material (12, 14, 16, and 18) can be used for controlling the size of the packaging material 9.

Second Embodiment

FIGS. 4A through 4D are schematic, cross-sectional diagrams showing a method of method of controlling a UV glue size for LCD devices according to the present invention. The method of the second embodiment includes using a patterned device layer (such as a liquid crystal display layer, a TFT, a storage capacitor or a color filter) as a size-controlling material to control the size of the UV glue.

As shown in FIGS. 4A–4D, a pixel electrode matrix structure is formed on a substrate (not shown). The substrate is preferably a glass substrate. A patterned device layer and a size-controlling material (22, 24, 26, or 28) are formed on the substrate, simultaneously. The size-controlling material (22, 24, 26, or 28) is harder than the UV glue for limiting the out-diffusion region of the UV glue. Since the patterned device layer and the size-controlling material (22, 24, 26, or 28) are formed simultaneously on the substrate, the size-controlling material (22, 24, 26, or 28) can be the same as the patterned device layer, such as a liquid crystal display layer, a TFT, a storage capacitor or a color filter.

The size-controlling material (22, 24, 26, or 28) is formed with a predetermined shape around a predetermined place in which a packaging material 9 is to be formed, using the predetermined place as the center of the size-controlling material (22, 24, 26, or 28). For example, as shown in FIG. 4A, the predetermined shape of the size-controlling material 22 includes a U-shape around the predetermined place in which the point-shaped packaging material 9 is to be formed, using the predetermined place of the packaging material 9 as the center of the size-controlling material 22. As shown in FIG. 4B, the predetermined shape of the size-controlling material 24 includes an arch-shape around the predetermined place in which the point-shaped packaging material 9 is to be formed, using the predetermined place as the center of the size-controlling material 24. As shown in FIG. 4C, the predetermined shape of the size-controlling material 26 includes a line-shape around the predetermined place in which the packaging material 9 is to be formed, using the predetermined place as the center of the size-controlling material 26. As shown in FIG. 4D, the predetermined shape of the size-controlling material 28 includes an L-shape around the predetermined place in which the point-shaped packaging material 9 is to be formed, using the predetermined place as the center of the size-controlling material 28. Generally speaking, the predetermined shape of the size-controlling material is not limited to the foregoing shapes (22, 24, 26, or 28). Any shape of size-controlling material that performs the function of limiting the out-diffusion region of the UV glue can be used.

The packaging material 9 is then formed in the predetermined place, which is preferably the corners of the pixel electrode matrix structure. The packaging material 9 is point-shaped. The packaging material includes a UV glue or a UV-hardened epoxy resin. Next, an alignment step is performed on the substrate. A pressuring process and a baking process are performed on the packaging material 9. Thus, the size-controlling material (22, 24, 26, or 28) can be used for controlling the size of the packaging material 9.

Third Embodiment

FIGS. 5A and 5D are schematic, cross-sectional diagrams showing a method of method of controlling a UV glue size for LCD devices according to the present invention. The method of the third embodiment combines the features of the first and the second embodiments, and includes using a combined structure (including a patterned device layer and a frame seal) to control the size of the UV glue.

As shown in FIGS. 5A–5B, a first part of the frame seal material is formed along the periphery of the pixel electrode matrix structure and a second part of the frame seal material is formed in the pixel electrode matrix structure (not shown). The patterned device layer is then provided on a substrate. Thus, the composite size-controlling material (32 or 34) includes the second part of the frame seal and the patterned device layer. The material of the frame seal includes a thermally hardened epoxy resin, a thermally hardened epoxy resin/a thermal phenoxy resin, an epoxy resin which is inarched with a silicon rubber, or a silicon rubber. The material of the patterned device layer includes a liquid crystal display layer, a TFT, a storage capacitor or a color filter.

The composite size-controlling material (32 or 34) is formed with a predetermined shape around a predetermined place in which a packaging material 9 is to be formed, using the predetermined place as the center of the composite size-controlling material (32 or 34). For example, as shown in FIG. 5A, the predetermined shape of the composite size-controlling material 32 includes a U-shape around the predetermined place in which the point-shaped packaging material 9 is to be formed, using the predetermined place as the center of the size-controlling material 32. The composite size-controlling material 32 includes a patterned device layer 32a and a frame seal 32b, wherein the patterned device layer 32a is L-shaped and the frame seal material 32b is line-shaped. Alternatively, the patterned device layer 32a is line-shaped and the frame seal material 32b is L-shaped. As shown in FIG. 5B, the predetermined shape of the composite size-controlling material 34 includes an L-shape around the predetermined place in which the point-shaped packaging material 9 is to be formed using, the predetermined place as the center of the size-controlling material 34. The composite size-controlling material 34 includes a patterned device layer 34a and a frame seal 34b, wherein the patterned device layer 34a is line-shaped and the frame seal material 34b is also line-shaped. Generally speaking, the predetermined shape of the size-controlling material is not limited to the foregoing shapes (32 or 34). Any shape of size-controlling material that performs the function of limiting the out-diffusion region of the UV glue material can be used.

The packaging material 9 is then provided in the predetermined place, which is, for example, in the corners of the pixel electrode matrix structure. The size of the packaging material 9 is point-shaped. The packaging material includes a UV glue or a UV-hardened epoxy resin. Next, an alignment step is performed on the substrate. A pressuring process and a baking process are performed on the packaging material 9. Thus, the size-controlling material (32 or 34) can be used for controlling the size of the packaging material 9.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of controlling a packaging material size for liquid crystal display (LCD) devices, which include a substrate and a pixel electrode matrix structure already formed thereon, the method comprising the steps of:

providing a frame seal material on the substrate, wherein the frame seal is formed along the periphery of the pixel electrode matrix structure;

providing a size-controlling material to limit out diffusion of a packaging material, the size-controlling material being harder than the packaging material, wherein the size-controlling material is formed with a predetermined shape around or aside a predetermined place in which the packaging material is formed, using the predetermined place as a center of the size-controlling material;

providing the packaging material on the predetermined place used for later bonding the substrate with another substrate, the packaging material being point-shaped;

performing an alignment step on the substrate; and performing a pressuring process and a baking process on the packaging material, the size-controlling material being used for controlling a size and limiting out diffusion of the packaging material.

2. The method of claim 1, wherein the substrate includes a glass substrate.

3. The method of claim 1, wherein the packaging material includes a UV glue.

4. The method of claim 1, wherein the packaging material includes a UV-hardened epoxy resin.

5. The method of claim 1, wherein the size-controlling material includes a seal material the same as that of the frame seal.

6. The method of claim 1, wherein the size-controlling material includes a thermally hardened epoxy resin.

7. The method of claim 1, wherein the size-controlling material includes a thermally hardened epoxy resin and a thermal phenoxy resin.

8. The method of claim 1, wherein the size-controlling material includes an epoxy resin which is inarched with a silicon rubber.

9. The method of claim 1, wherein the size-controlling material includes a silicon rubber.

10. The method of claim 1, wherein the predetermined shape of the size-controlling material includes a U-shape around the predetermined place in which the point-shaped packaging material is formed.

11. The method of claim 1, wherein the predetermined shape of the size-controlling material includes a L-shape around the predetermined place in which the point-shaped packaging material is formed.

12. The method of claim 1, wherein the predetermined shape of the size-controlling material includes an arch-shape around the predetermined place in which the point-shaped packaging material is formed.

13. The method of controlling a packaging material size for LCD devices of claim 1, wherein the predetermined shape of the size-controlling material includes a L- or straight line-shape aside to the predetermined place in which the point-shaped packaging material is formed.

14. A method of controlling a packaging material size for liquid crystal display (LCD) devices, which include a substrate and a pixel electrode matrix structure already formed thereon, the method comprising the steps of:

providing a frame seal material, which is formed along the periphery of the pixel electrode matrix structure;

providing a size-controlling layer to limit out diffusion of a packaging material, the size-controlling layer being harder than the packaging material, and the size-controlling layer and an LCD device layer being patterned and formed on the substrate, simultaneously, wherein the size-controlling layer is formed with a predetermined shape around or aside a predetermined place in which the packaging material is to be formed, using the predetermined place as a center of the size-controlling layer;

providing the packaging material in the predetermined place, the bonding material being point-shaped, used for later packing the substrate with another substrate;

performing an alignment step on the substrate; and performing a pressuring process and a baking process on the packaging material, the size-controlling layer being used for controlling a size and limiting out diffusion of the packaging material.

15. The method of claim 14, wherein the substrate includes a glass substrate.

16. The method of claim 14, wherein the packaging material includes a UV glue.

17. The method of claim 14, wherein the packaging material includes a UV-hardened epoxy resin.

18. The method of claim 14, wherein the predetermined shape of the size-controlling layer includes a U-shape around the predetermined place in which the point-shaped packaging material is formed.

19. The method of claim 14, wherein the predetermined shape of the size-controlling layer includes an L-shape around the predetermined place in which the point-shaped shaped packaging material is formed.

20. The method of claim 14, wherein the predetermined shape of the size-controlling layer includes an arch-shape around the predetermined place in which the point-shaped packaging material is formed.

21. The method of claim 14, wherein the predetermined shape of the size-controlling layer includes a L- or straight line-shape aside to the predetermined place in which the point-shaped packaging material is formed.

22. A method of controlling a packaging material size for liquid crystal display (LCD) devices, which include a substrate and a pixel electrode matrix structure already formed thereon, the method comprising the steps of:

setting a predetermined place on which a packaging material is to be disposed thereon;

providing a frame seal material, wherein the frame seal material includes a first part of the frame seal material being formed along the periphery of the pixel electrode matrix structure and a second part of the frame seal material being formed around or aside the predetermined place;

providing a size-controlling material to limit out diffusion of the packaging material, the size-controlling material being harder than the packaging material, the size-controlling material and an LCD device layer being patterned and formed on the substrate, simultaneously, the size-controlling material and the second part of the frame seal material together composing a size-controlling structure, with a predetermined shape around or aside the predetermined place;

disposing the packaging material on the predetermined place, the bonding material being point-shaped, and being used for packing the substrate with another substrate;

performing an alignment step on the substrate; and performing a pressuring process and a baking process on the packaging material, the size-controlling layer being used for controlling a size and limiting out diffusion of the packaging material.

23. The method claim 22, wherein the substrate includes a glass substrate.

24. The method claim 22, wherein the packaging material includes a UV glue.

25. The method claim 22, wherein the packaging material includes a UV-hardened epoxy resin.

26. The method claim 22, wherein the predetermined shape of the size-controlling structure includes a U-shape around the predetermined place in which the point-shaped packaging material is formed, wherein the size-controlling material is L-shaped and the second part of the frame seal material is line-shaped.

27. The method claim 22, wherein the predetermined shape of the size-controlling structure includes a U-shape around the predetermined place in which the point-shaped packaging material is formed, wherein the size-controlling material is line-shaped and the second part of the frame seal material is L-shaped.

28. The method claim 22, wherein the predetermined shape of the size-controlling structure includes a L-shape around the predetermined place in which the point-shaped packaging material is formed, wherein the size-controlling material is line-shaped and the second part of the frame seal material is straight line-shaped.

\* \* \* \* \*